INVENTORS
Clarence E. Anderson
Gary H. Rickenbrode

ATTORNEY

United States Patent Office 3,509,750
Patented May 5, 1970

3,509,750
PORTABLE MACHINE
Clarence E. Anderson and Gary H. Rickenbrode, Wadsworth, Ohio, assignors to The Babcock & Wilcox Company, New York, N.Y., a corporation of New Jersey
Filed Apr. 21, 1967, Ser. No. 632,803
Int. Cl. B23b 39/14
U.S. Cl. 77—2    12 Claims

ABSTRACT OF THE DISCLOSURE

A portable drilling and boring machine including a rotatable platform which slidably and positionably carries a machine head for forming vertical penetrations in the head of a nuclear reactor vessel upon which the platform is mounted. The platform also carries a mast and boom arrangement with a hoist to facilitate placement and movement of machine tools. A universal coupling is connected to the head of the machine for transmitting motive force to the tools. The machine may further include a template for guiding machine tools toward and away from the reactor head.

BACKGROUND AND SUMMARY OF THE INVENTION

Stationary machines are used to perform machining operations on movable workpieces, whereas portable machines are used to perform like machining operations on stationary workpieces. Machines are either made stationary or portable depending, for example, on the time required to perform the machining operation, the amount of metal being removed from the workpiece, the physical dimensions of the machine tool and/or workpiece, and the weight of machine tool and/or workpiece.

Conventional stationary machines require a foundation that is large enough to both continuously support the machine tool and temporarily support the workpiece, whereas the conventional portable machine is continuously supported on its own foundation apart from the workpiece. To bridge the utility gap between the conventional machines, industry has devised a so-called "satellite" machine which is characterized in that it is attachable to the workpiece and supported in place thereby during the machining operation. In essence, the satellite machine is a special type of portable machine distinguishable over the conventional type in that it temporarily utilizes the workpiece as a supporting foundation during the machining operation. When using a satellite machine, the workpiece may be moved or disposed on a stationary or movable foundation during the machining operation without disturbing the relationship between the workpiece and machine tool.

The inventors have recently been confronted with the problem of tooling for on-site assembly of pressure vessels up to 30 feet in diameter and 150 feet in length which weigh approximately 1,000 tons. Off-the-shelf conventional machines and satellite machines were found to be lacking in versatility and inadequate for many operations. The instant disclosure relates to a satellite-type machine adapted to perform precision machining operations on such grossly-proportioned workpieces in the field. More particularly, the disclosure relates to a satellite-type portable drilling and boring machine for machining nuclear reactor pressure vessels, comprising the combination of a movable platform, a machine head mounted on the platform, means for moving the machine head across the platform, a guiding means for the machine head, means for interconnecting a tool to the machine head, and means for moving and lifting tools attachable to the machine head by the interconnecting means. The combination may also further include a template for precisely guiding machine tools.

DESCRIPTION OF THE PREFERRED EMBODIMENT

Figure 1:
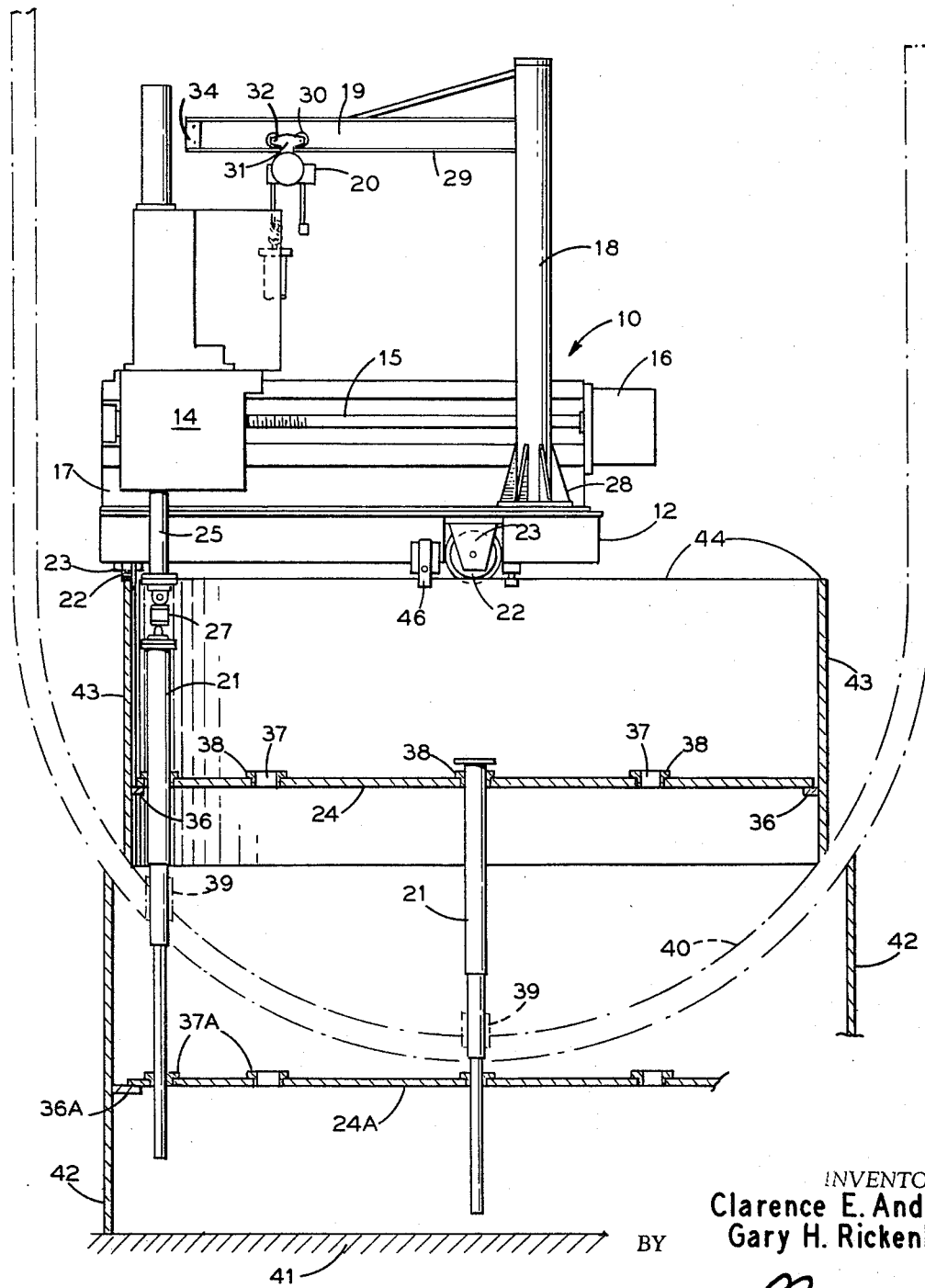
FIG. 1 is a side elevation view of the inventive device.

Referring now to the drawings wherein like reference numerals designate like or corresponding parts throughout the several views there is shown in FIG. 1 a satellite-type, vertically oriented, portable drilling and boring machine 10 which generally comprises an expandable triangularly-shaped frame that acts as a rotatable horizontal platform 12 upon which there is mounted a motorized drilling and boring machine head 14 and a motorized feed mechanism 16 that transmits motive power through a lead screw 15 adapted to the machine head 14 for moving the head toward and away from the center of the platform 12. An upright mast member 18 is provided to support a boom or arm 19 which overhangs the platform and carries a movable hoist 20 for raising and lowering heavy machining tools 21. A template 24 is included for guiding a tool relative to a workpiece.

Figure 2:
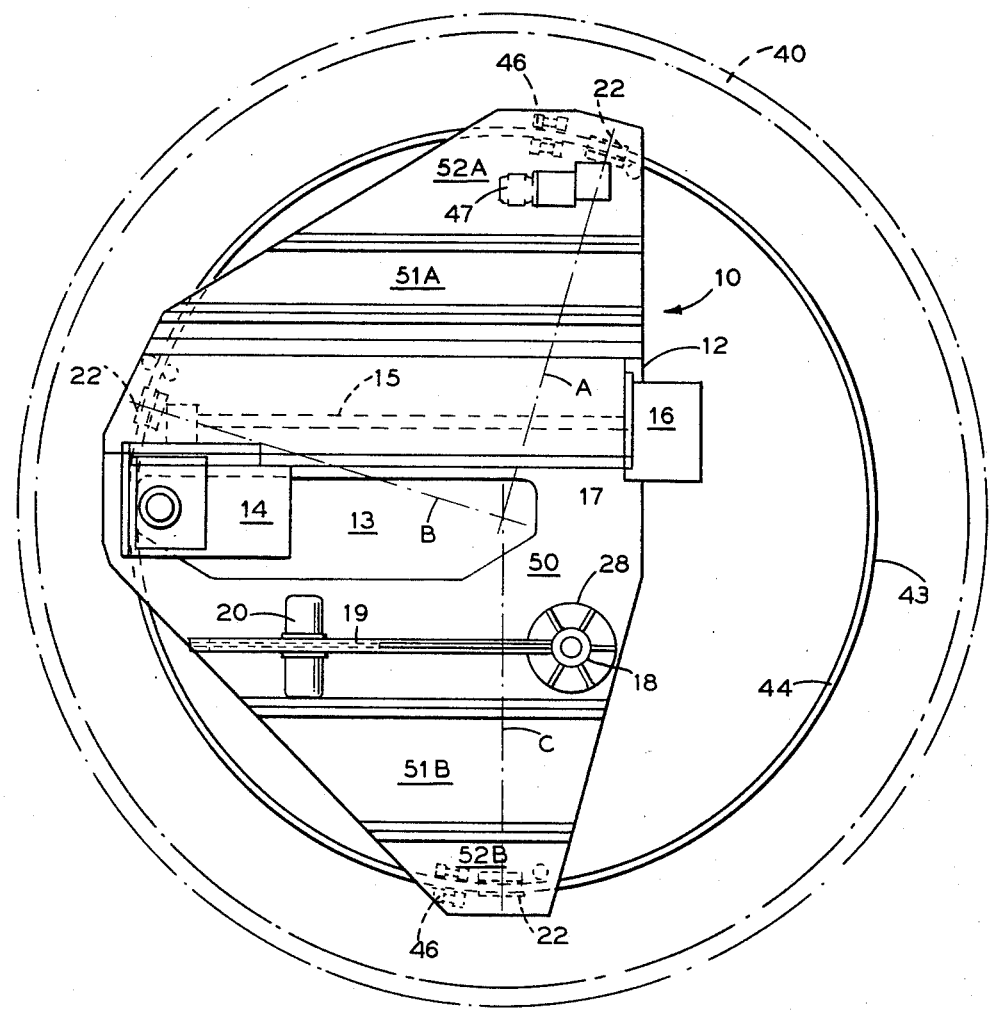
FIG. 2 is a plan view of the inventive device as shown in FIG. 1.

As shown in FIGS. 1 and 2, the platform 12 is movably supported by three rollers 22, each of which is axially journalled for rotation in borings formed in a bifurcated member 23 depending from the platform. The rollers 22 are so oriented with respect to one another that the platform is rotatable about a vertical axis. The rollers 22 provide three points of support for the platform 12 to stabilize it in a plane, the center of rotation of the platform being defined by the point of intersection of lines $a$, $b$ and $c$ drawn through the axis of each of the rollers 22.

The machine head 14 is movably mounted on a crossrail 17 of welded construction disposed on the platform 12 with its longitudinal axis oriented substantially parallel to a radius of the circle of rotation of the platform. The crossrail 17 acts as a guide for the machine head and is connected to the platform by means of bolts (not shown). The feed mechanism 16 is mounted on the end of the crossrail 17 near the center of rotation of the platform and is provided with a lead screw 15 movably connected to the head 14 by means well known in the art for jacking the machine head 14 radially across the platform.

The machine head 14 includes a vertical spindle 25 adapted to carry a universal coupling 27 for interconnecting machining tools 21 such as drilling or boring tools to the head. The spindle 25 protrudes through a cutout 13 formed in the platform 12 and is radially movable therewithin. The cutout 13 is advantageously a manhole large enough to facilitate tool changing, observation of the machining operation from above, and hoisting tools therethrough while the machining operation is in progress. The upright member 18 is vertically supported in place by a pedestal 28 connected to the platform 12 near the center of rotation. The arm 19 horizontally overhangs the platform and has one end pivoted to the upper end of the vertical member 18 for rotation in place thereabout in a horizontal plane. It is seen that the arm 19 is provided with a flange 29 along the lower side of its longitudinal length that acts as a track for the hoist 20. The hoist 20 is suspended from a frame 31 connected to the axles 32 of rollers 30 that are rollably mounted in tandem on the flange 29 for movement along the longitudinal length of the arm. The free end of the arm 19 is provided with a removable stop 34, which may be a bolt, to prevent the hoist from rolling off the end when being used and to facilitate removal thereof when desired.

The preferred embodiment is used for boring shop-drilled penetrations in a lower head section 40 of a nuclear reactor in the field. As shown in FIG. 1 the head section 40 is a generally elliptically shaped member supported in place above a foundation 41 by a cylindrically shaped skirt 42, endwise extending therebetween, that is substantially coaxially aligned with the head 40. A cylindrically shaped shroud 43 extending upwardly from the interior of the head 40 is part of the head assembly, remaining in place throughout the life of the reactor. The upper rim 44 of the shroud 43 acts as a temporary track for the platform rollers 22 which may advantageously be flanged wheels, the flanges forming a recess to receive the rim of the shroud.

Clamps 46, well-known in the art, are provided for locking the platform 12 in place to the shroud 43 during the machining operation, thus fixing the position of the boring machine 10 while boring is in progress. The clamps 46 are advantageously connected to extend downwardly from the platform 12 adjacent each of the rollers 22.

A reversible platform driving motor 47, mounted beneath the platform and supported thereby, is cooperatively associated with one of the platform rollers 22 for 360° rotation of the platform on the rim of the shroud.

Figure 3:
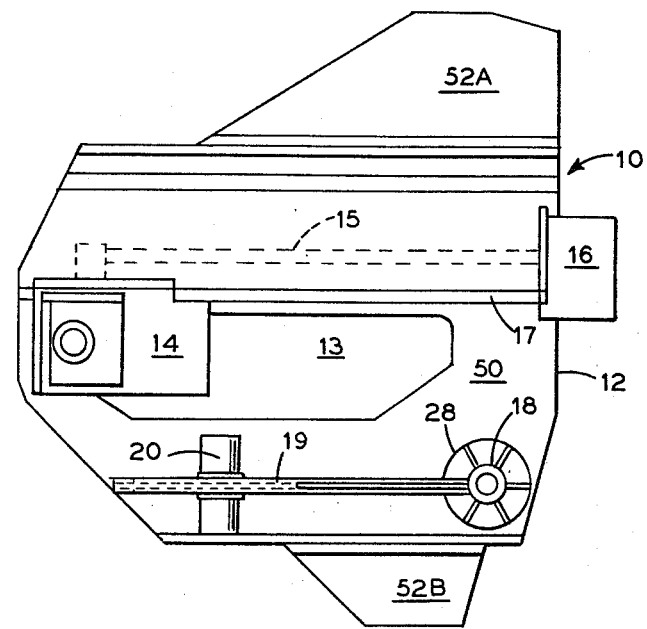
FIG. 3 is a partial plan view of the inventive device as shown in FIG. 2, with the spacers removed.

As shown in FIGS. 2 and 3, the platform 12 is an expandable generally triangularly shaped frame made in five interconnected sections including a center section 50, two intermediate sections 51A and 51B, and two end sections 52A and 52B. The intermediate sections 51A, 51B are provided with opposing longitudinal flanges, well-known in the art, for connecting the end sections 52A, 52B to the center section 50. The intermediate sections may be removed for connecting the end sections 52A, 52B directly to the center section 50. Intermediate sections 51 of greater or lesser width may be provided, as required, to adapt the platform to various shroud dimensions. It is seen that the center section 50 carries the head 14, feed mechanism 16 and upright member 18, whereas the intermediate and end sections 51, 52 provide working room for the operator.

The template 24 is a precision drilled flat circular plate which may conveniently be edgewise supported in place beneath the platform on lugs 36 welded to the shroud 43. The openings 37 in the template 24 are arranged in a pattern that corresponds to the desired pattern of head penetrations after boring, as projected on a horizontal plane. Advantageously, a second template 24A of similar construction may be disposed beneath the reactor head on lugs 36A welded to the skirt 42. The template 24, or templates 24 and 24A as the case may be, is/are precisely aligned with respect to the head by means of optical equipment and secured in place on the lugs by means well-known in the art. The template openings 37 are provided with hardened bushings 38 and 38A inserted therein to guide a boring bar. In this connection it should be appreciated that the universal coupling 27 used is a double coupling, to avoid the need for precision alignment of the boring machine and platform. Precise alignment for the boring bars is provided by the templates 24 and 24A. The boring bars are provided with cutting tools 39 well-known in the art for removing metal from the walls of the pre-drilled head penetrations.

In practice, the span time for boring successive head penetrations is considerably reduced by providing a plurality of boring bars equipped with cutting tools. While the first head penetration is being bored, the hoist may be used for placing second and third boring bars into position for succeeding boring operations, the first boring bar being removed while the second boring operation is being performed, and so on, until boring operations are completed.

Further, in practice, the lower template 24A is installed before the reactor head is placed on its permanent foundation in the field and is removed after boring operations are completed. Further, after boring operations are completed, the boring machine 10 is lifted off the rim and stored for future use, the template 24 is removed, and the lugs 36 cut off the shroud 43.

What is claimed is:

1. The combination comprising:
   (a) a movable platform,
   (b) a machine head mounted on the platform and movably supported thereby,
   (c) means adapted to the platform for moving the machine head thereacross,
   (d) means adapted to the platform for guiding the machine head,
   (e) means for interconnecting a machine tool to the machine head,
   (f) means adapted to the platform for placing and moving the machine tool, and
   (g) a template for guiding machine tools toward and away from a workpiece.

2. The combination according to claim 1 wherein the platform is provided with a plurality of rollers depending therefrom for rotation of the platform in a substantially horizontal plane.

3. The combination according to claim 1 wherein the machine head is a motorized drilling and boring head having a spindle which protrudes through a cutout formed in the platform.

4. The combination according to claim 1 wherein the means for moving the machine head is a motorized feed mechanism mounted on the platform and provided with a lead screw connected to the machine head, the lead screw being mounted for rotation in place to jack the machine head across the platform.

5. The combination according to claim 1 wherein the guiding means comprises a crossrail mounted on the platform for slidably moving the machine head thereacross.

6. The combination according to claim 1 wherein the interconnecting means comprises a universal coupling carried by the machine head for adapting machine tools thereto.

7. The combination according to claim 1 wherein the placing means includes an upright member mounted on the platform that has an arm pivoted thereto for rotation in place thereabout, and a hoist movably mounted on the arm for placing and moving machine tools.

8. The combination according to claim 1 wherein three rollers are provided for stabilization of the platform in a substantially horizontal plane.

9. The combination according to claim 1 wherein a plurality of templates are provided and wherein the interconnecting means comprises a universal coupling carried by the machine head for adapting machine tools thereto, said templates providing precision alignment for said machine tools.

10. The combination comprising:
    (a) a platform adapted to be mounted on a workpiece,
    (b) a machine head mounted on the platform and supported thereby,
    (c) means adapted to the platform for moving the machine head thereacross,
    (d) means for interconnecting a machine tool to the machine head,
    (e) means for placing and moving the machine tool, and
    (f) a template aligned with respect to the workpiece for guiding the machine tool relative to the workpiece.

11. The combination according to claim 10 wherein the interconnecting means is a universal coupling.

12. The combination according to claim 11 further comprising a second template for guiding the machine tool relative to the workpiece, said templates providing precision alignment for the machine tool.

References Cited

UNITED STATES PATENTS

| | | | |
|---|---|---|---|
| 2,011,940 | 8/1935 | Myers | 77—2 |
| 2,013,933 | 9/1935 | Wagner | 90—12 |
| 3,158,065 | 11/1964 | Korenek et al. | 77—4 |
| 3,333,487 | 8/1967 | Parry | 77—4 |

FOREIGN PATENTS

| | | |
|---|---|---|
| 390,424 | 2/1924 | Germany. |
| 446,707 | 12/1912 | France. |
| 737,685 | 7/1966 | Canada. |

GERALD A. DOST, Primary Examiner

U.S. Cl. X.R.

90—12